(12) United States Patent
Huang et al.

(10) Patent No.: US 9,568,373 B2
(45) Date of Patent: Feb. 14, 2017

(54) CABLE-BASED SENSOR FOR DETECTING MATERIAL LEVEL AND TEMPERATURE

(71) Applicant: Finetek Co., Ltd., New Taipei (TW)

(72) Inventors: Chien-Lung Huang, New Taipei (TW); Sheng-Shou Chen, New Taipei (TW); Tzu-Chuan Tsai, New Taipei (TW); Yao-Chen Yu, New Taipei (TW); Chao-Kai Cheng, New Taipei (TW); Ting-Kuo Wu, New Taipei (TW)

(73) Assignee: Finetek Co., Ltd., New Taipei (TW)

( * ) Notice: Subject to any disclaimer, the term of this patent is extended or adjusted under 35 U.S.C. 154(b) by 509 days.

(21) Appl. No.: 14/199,016

(22) Filed: Mar. 6, 2014

(65) Prior Publication Data

US 2015/0146760 A1    May 28, 2015

(30) Foreign Application Priority Data

Nov. 25, 2013 (TW) .............................. 102142813 A

(51) Int. Cl.
| | |
|---|---|
| G01K 1/08 | (2006.01) |
| G01K 1/12 | (2006.01) |
| G01K 1/14 | (2006.01) |
| G01K 13/10 | (2006.01) |
| G01K 1/02 | (2006.01) |
| G01F 23/00 | (2006.01) |
| G01F 23/24 | (2006.01) |

(52) U.S. Cl.
CPC ............. *G01K 1/08* (2013.01); *G01F 23/0076* (2013.01); *G01F 23/246* (2013.01); *G01K 1/026* (2013.01); *G01K 13/10* (2013.01)

(58) Field of Classification Search
CPC .................................... G01K 1/08; G01K 1/12
USPC ................ 374/163, 179, 208, 142; 73/866.5
See application file for complete search history.

(56) References Cited

U.S. PATENT DOCUMENTS

| | | | | | |
|---|---|---|---|---|---|
| 2,445,159 | A | * | 7/1948 | Tegge ...................... | G01K 1/08 136/230 |
| 2,858,351 | A | * | 10/1958 | Taylor ...................... | G01K 1/08 136/234 |
| 9,316,543 | B2 | * | 4/2016 | Bronczyk .............. | G01D 21/00 |
| 2004/0109651 | A1 | * | 6/2004 | Lancaster .............. | G01K 11/32 385/101 |
| 2009/0016409 | A1 | * | 1/2009 | Mizoguchi ........... | C01G 45/125 374/185 |
| 2009/0323765 | A1 | * | 12/2009 | Yokoi ...................... | G01K 1/08 374/185 |

(Continued)

*Primary Examiner* — Gail Kaplan Verbitsky
(74) *Attorney, Agent, or Firm* — C. G. Mersereau; Nikolai & Mersereau, P.A.

(57) ABSTRACT

A cable-base sensor can detect a material level and temperatures of a material stored in a silo. The cable-base sensor comprises an electronic box, a cable, a stopper, and a signal processing module. The electronic box comprises a base and a space for containing the signal processing module, and a hole is formed through a bottom of the electronic box. The base is mounted in the bottom, and a tapered hole is formed through the base. A first end of the cable extents into the tapered hole and the hole, and spreads to form a cable bud. The stopper is a tapered block and pressed into the tapered hole for enforcing the cable bud to be sandwiched between the stopper and the base. The cable bud strengthens a connection between the electronic box and the cable for preventing damages from solid materials.

40 Claims, 15 Drawing Sheets

(56) References Cited

U.S. PATENT DOCUMENTS

2011/0243185 A1* 10/2011 Liu .................. E01D 19/16
                                                   374/142
2016/0252404 A1*  9/2016 Terada ................ G01K 1/08

* cited by examiner

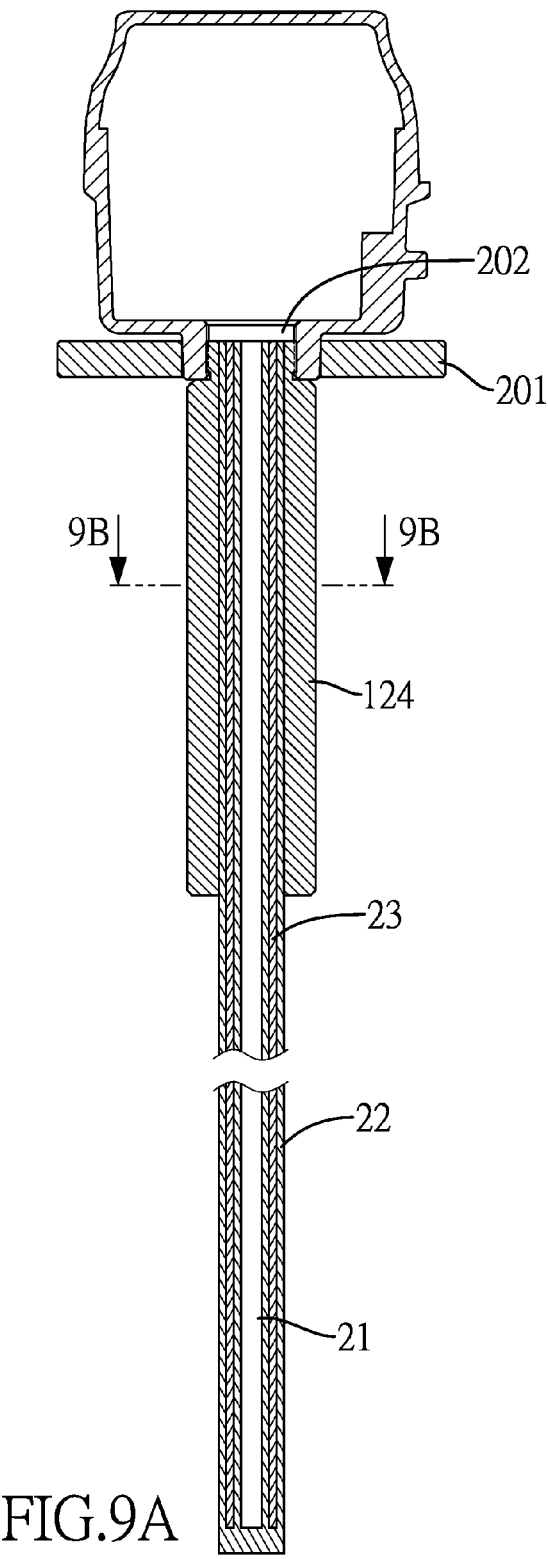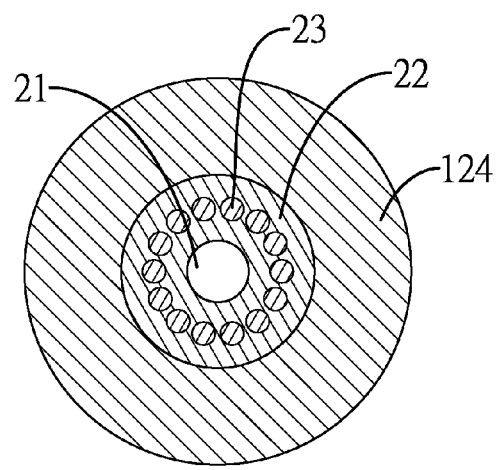
FIG. 9A
FIG. 9B

CABLE-BASED SENSOR FOR DETECTING MATERIAL LEVEL AND TEMPERATURE

BACKGROUND OF THE INVENTION

1. Field of the Invention

The present invention relates to a cable-based sensor, particularly to a cable-based sensor for detecting material level and temperature.

2. Description of the Related Art

For management of bulk material stored in a silo, a sensor for detecting material level is very important. The material level means a height of the material in the silo, and the material level can be converted to obtain the amount of the material stored in the silo. The sensor can be applied to petrochemical industry, food industry, feed industry, steel industry, cement industry, etc. Materials stored in a silo may be solid, liquid, or liquid-solid mixture. For example, the materials may be petroleum, coal, iron sand, cement, flour, cattle fat, etc. When each material is stored in a silo, temperature, moisture and an amount of the material will influence the quality of the materials. In some particular industries, when the temperature of the material stored in the silo is not properly controlled, a dry and dusty material may cause a dust explosion.

When the material is liquid, a conventional sensor can detect temperature, moisture, or material level of the material. The conventional sensor sends magnetic fields produced by voltage-pulses to the material, and detects a feedback of the magnetic fields for calculating the material level. Further, another type of conventional sensor can detect a change between liquid tension of the material and its impedance for calculating the material level.

However, the foregoing conventional sensors cannot detect solid material because detecting cables of the conventional sensors are easily damaged by impacts of the solid material. Therefore, the conventional sensors need to be further improved.

SUMMARY OF THE INVENTION

An objective of the present invention is to provide a cable-based sensor for detecting material level and temperature. The cable-based sensor can detect the material level of a liquid material and a solid material, and detect the temperature of the liquid material and the solid material. The cable-based sensor has a cable and an electronic box, wherein the cable is firmly connected to the electronic box to prevent impact by a solid material.

To achieve the foregoing objective, the cable-based sensor comprises an electronic box, a cable, a stopper, and a signal processing module.

The electronic box includes a top, a bottom, a space formed in the top for containing the signal processing module, a hole, and a base. The hole is formed through the bottom, and communicates with the space. The base is mounted in the bottom. A tapered hole is formed through the base.

The cable comprises a sensing channel, an insulation layer, a plurality of steel wires, and a plurality of temperature sensing units. A first end of the cable extends to the tapered hole of the base and the hole of the electronic box. The sensing channel is covered by the insulation layer. The steel wires are mounted around the sensing channel and embedded in the insulation layer. Terminals of the steel wires extend out of the insulation layer and spread to form a cable bud. The cable bud is mounted in the tapered hole of the base. The temperature sensing units are mounted in and along the sensing channel.

The stopper is a tapered block and pressed into the tapered hole of the base for enforcing the cable bud to be sandwiched between the stopper and the base.

The signal processing module is mounted in the space of the electronic box and is electronically connected with the temperature sensing units. The cable bud is an electrode of the signal processing module.

The cable bud is sandwiched between the stopper and the base. Therefore, the cable can be firmly positioned on the bottom of the electronic box according to the cable bud. When the cable is impacted by a solid material, the cable can still be firmly positioned on the bottom of the electronic box and not damaged by the solid material.

Other objectives, advantages and novel features of the invention will become more apparent from the following detailed description when taken in conjunction with the accompanying drawings.

BRIEF DESCRIPTION OF THE DRAWINGS

FIG. 9A is a cross-sectional side view of a second embodiment of a cable of the present invention;

FIG. 9B is a cross-sectional top view of the second embodiment of the cable;

DETAILED DESCRIPTION OF THE INVENTION

Figure 1:
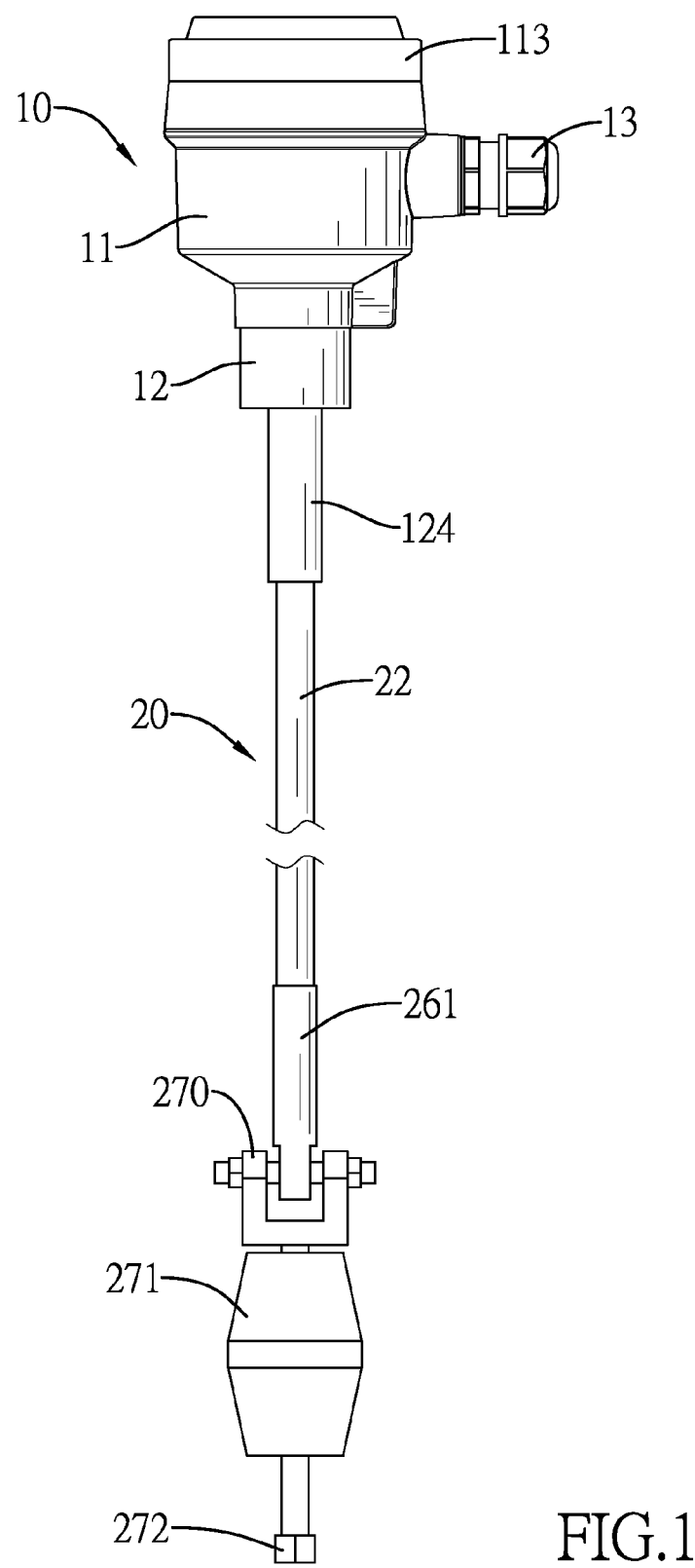
FIG. 1 is a side view of an embodiment of a sensor of the present invention.
Figure 2:
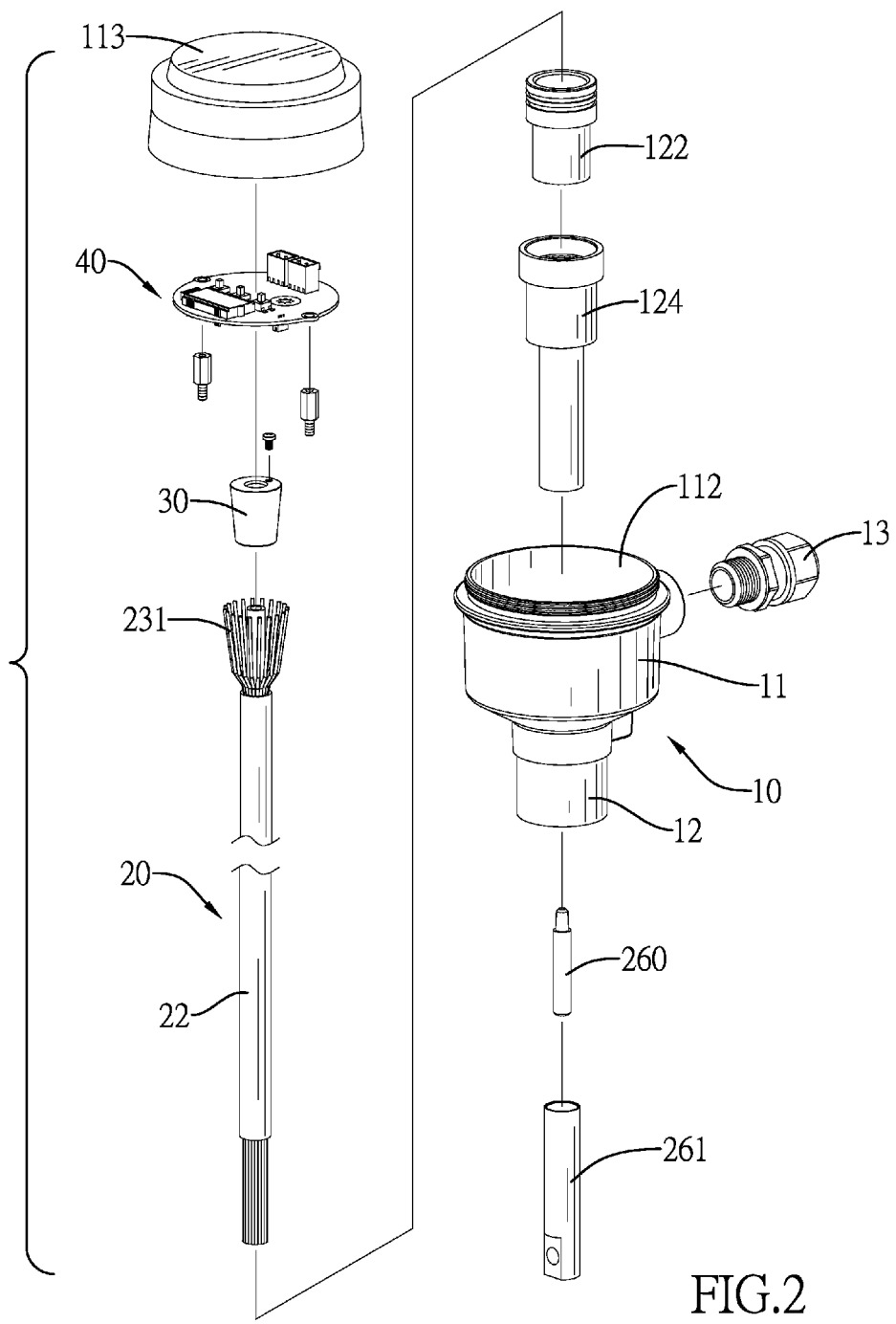
FIG. 2 is an exploded view of the sensor of FIG. 1.
Figure 3:
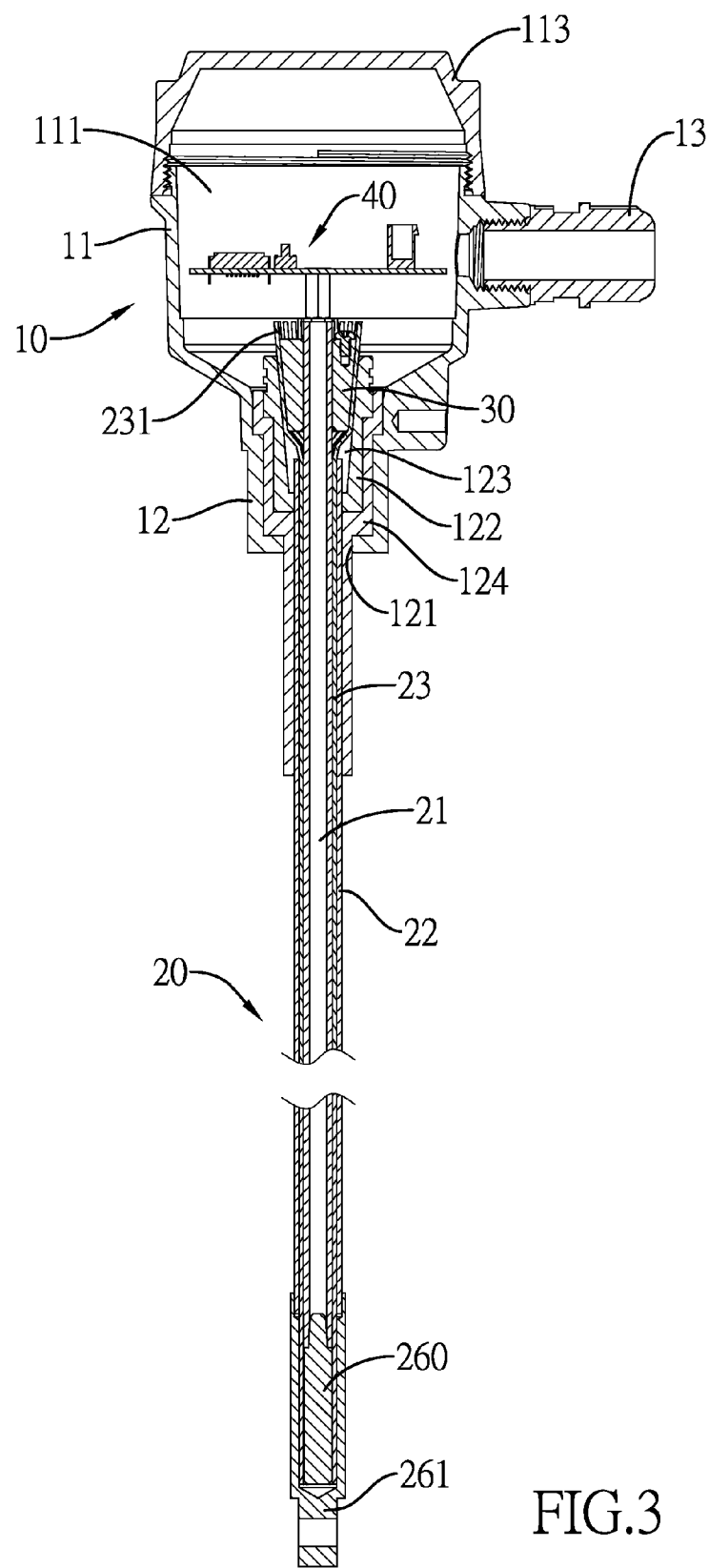
FIG. 3 is a cross-sectional side view of the sensor of FIG. 1.
Figure 4:
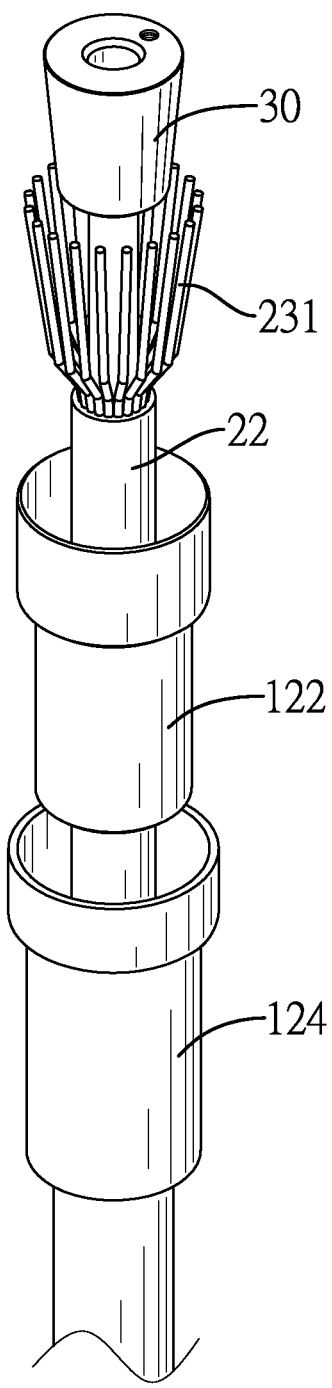
FIG. 4 is a partially exploded view of the sensor of FIG. 1.
Figure 5:
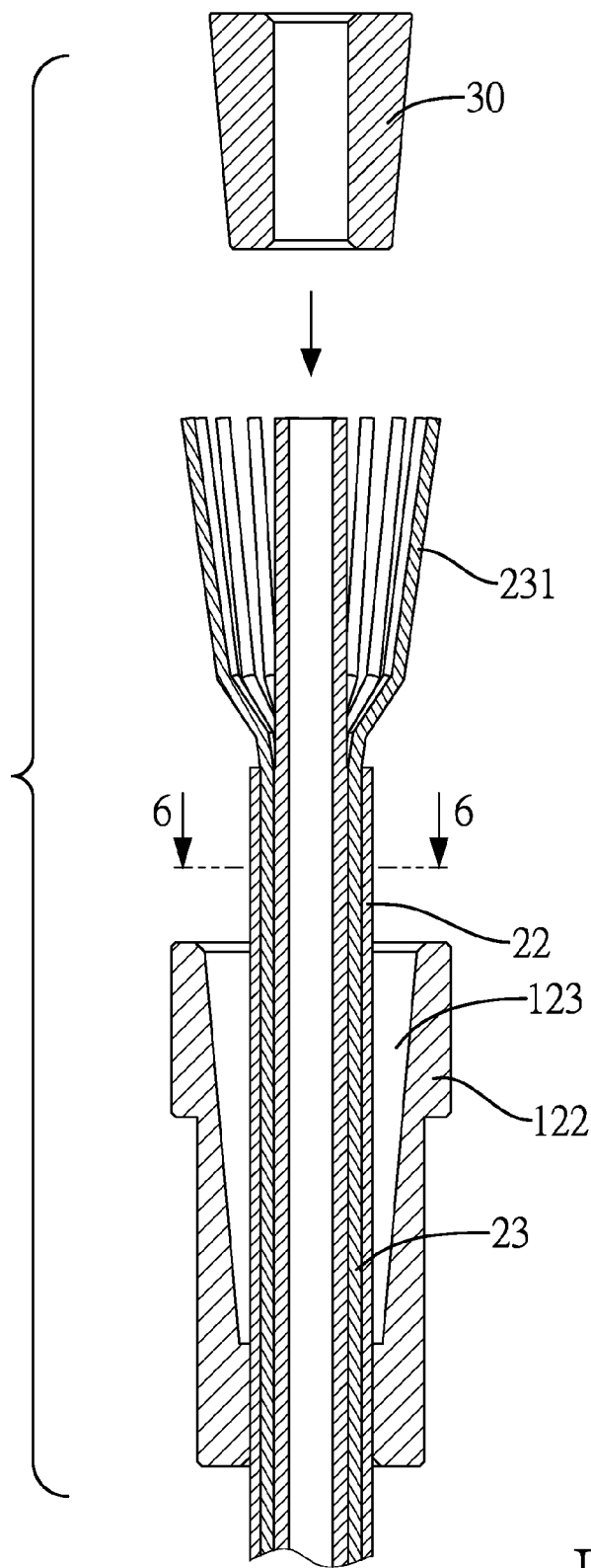
FIG. 5 is a partially cross-sectional side view of the sensor of FIG. 1.
Figure 6:
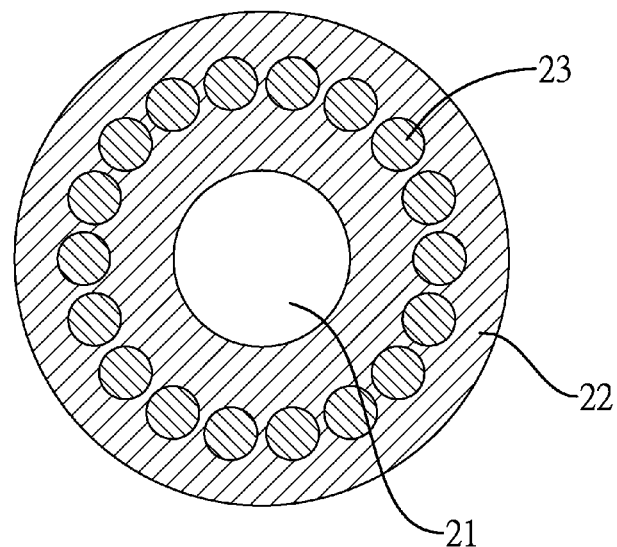
FIG. 6 is a cross-sectional top view of a cable of the sensor of FIG. 1.

With reference to FIGS. 1, 2 and 3, a first embodiment of a cable-based sensor of the present invention comprises an electronic box 10, a cable 20, a stopper 30, and a signal processing module 40.

The electronic box 10 includes a top 11, a bottom 12, a space 111 formed in the top 11, a hole 121 and a base 122. The hole 121 is formed through the bottom 12 and communicates with the space 111. The base 122 is mounted in the bottom 12. A tapered hole 123 is formed through the base 122.

The cable 20 includes a sensing channel 21, an insulation layer 22 for covering the sensing channel 21, a plurality of steel wires 23 and temperature sensing units 24. A first end of the cable 20 extends to the tapered hole 123 of the base 122 and the hole 121 of the electronic box 10. The steel wires 23 are mounted around the sensing channel 21 and embedded in the insulation layer 22. Terminals of the steel wires 23 extend out of the insulation layer 22 and spread to form a cable bud 231. The cable bud 231 is mounted in the tapered hole 123 of the base 122. The temperature sensing units 24 (not shown in figures) are mounted in and along the sensing channel 21, and transmission lines (not shown in figures) are provided in the sensing channel 21 for electronically connecting between the temperature sensing units 24 and the signal processing module 40. The steel wires 23 can provide superior tensile strength and act as an electrode of the signal processing module 40. For example, the steel wires 23 can be an anode or a cathode of the signal processing module 40 for detecting a material level of a material stored in a silo. In the embodiment, the insulation layer 22 may be made of Polyvinylidene difluoride (PVDF), teflon, Polypropylene (PP), ethylene propylene diene monomer (EPDM), or polyether ether ketone (PEEK).

The stopper 30 is a tapered block and is pressed into the tapered hole 123 of the base 122 for enforcing the cable bud 231 to be sandwiched between the stopper 30 and the base 122.

With reference to FIG. 3 to FIG. 6, the top 11 of the electronic box 10 further comprises an opening 112, and a lid 113 is provided for covering the opening 112. The electronic box 10 further comprises a waterproof connector 13 mounted on a side of the electronic box 10 and communicating with the space 111. Power lines or transmission lines may extend through the waterproof connector 13 to be electronically connected to the signal processing module 40. Further, the power lines or transmission lines are also electronically connected to an external power source for receiving electronic power or transmitting level signals to other electronic devices, so that the other electronic devices can obtain the material level according to the level signals. The bottom 12 of the electronic box 10 further comprises an insulating sleeve 124. The insulating sleeve 124 is a hollow tube and extends through the hole 121 of the electronic box 10. An upper end of the insulating sleeve 124 is mounted in the bottom 12 and receives the base 122. A lower end of the insulating sleeve 124 extends through the hole 121, and is mounted around the first end of the cable 20. In the embodiment, the insulating sleeve 124 may be made of Polyvinylidene difluoride (PVDF), teflon, Polypropylene (PP), ethylene propylene diene monomer (EPDM), or polyether ether ketone (PEEK).

Figure 7:
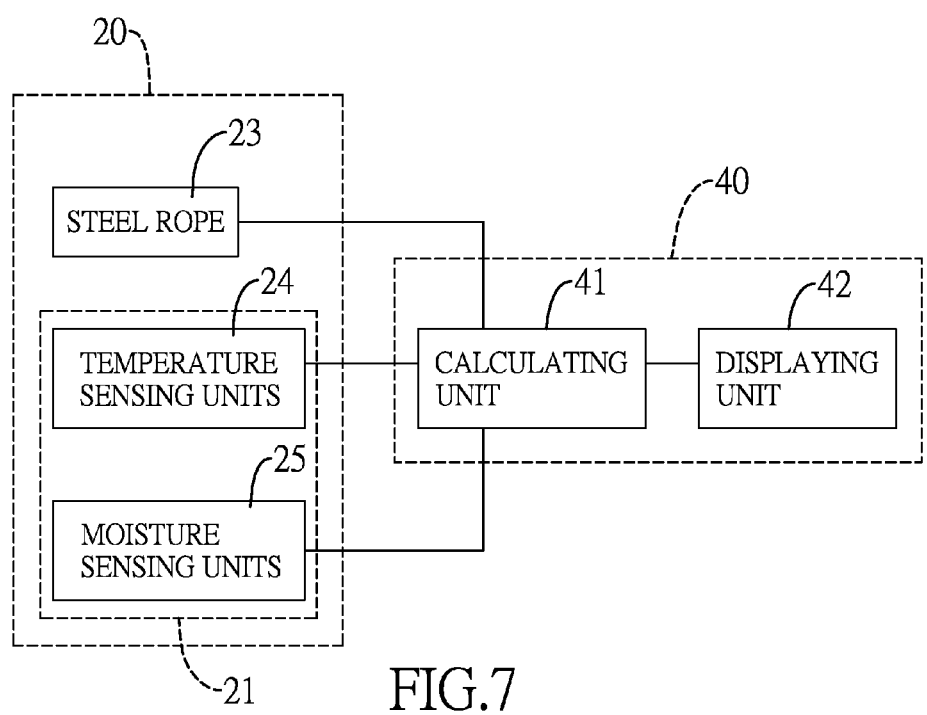
FIG. 7 is a block diagram of the sensor of FIG. 1.
Figures 8A, 8B:
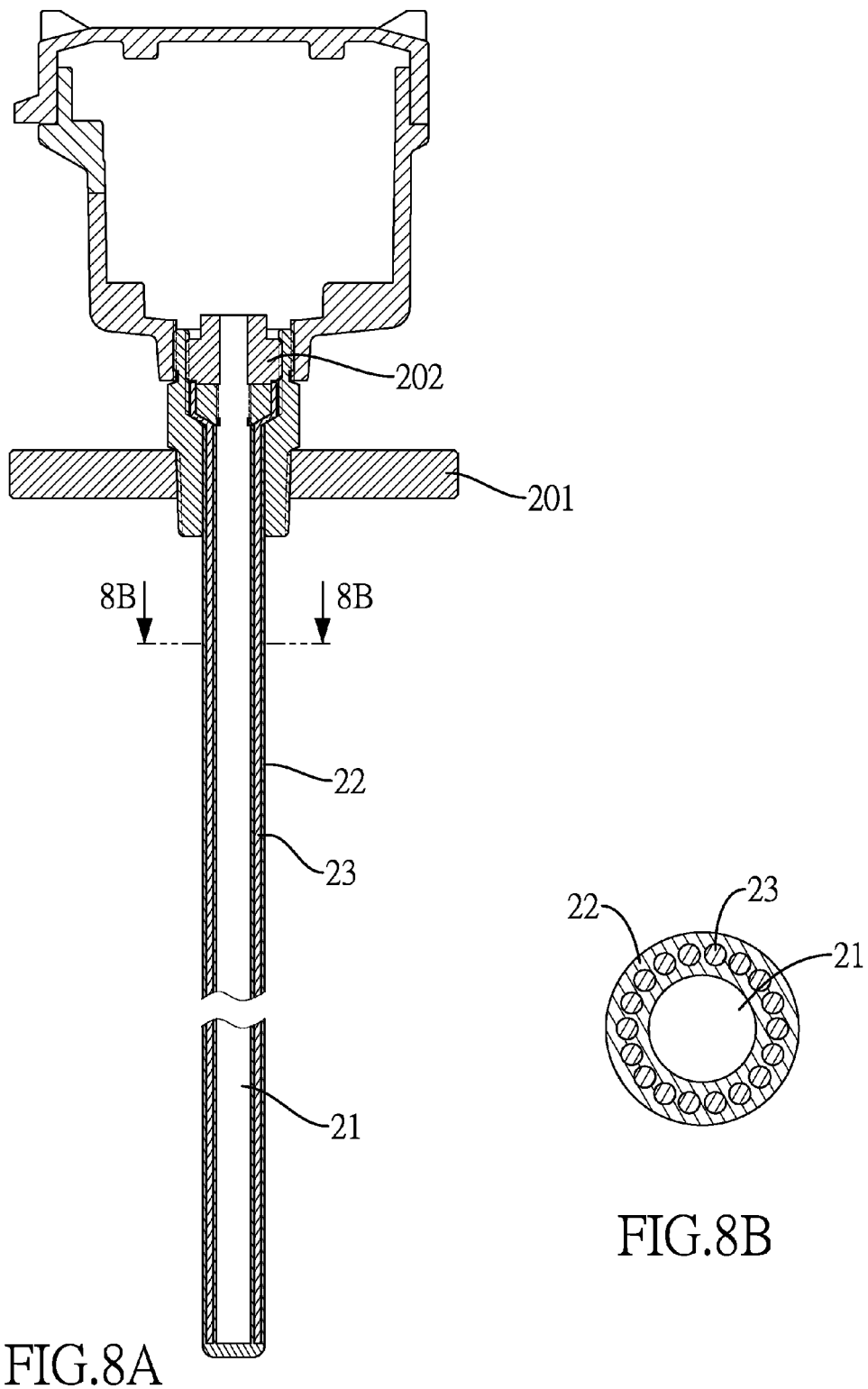
FIG. 8A is a cross-sectional side view of a first embodiment of a cable of the present invention.
FIG. 8B is a cross-sectional top view of the first embodiment of the cable.

With reference to FIG. 7, the signal processing module 40 is mounted in the space 111 of the electronic box 10, and is electronically connected with the temperature sensing units 24 and the steel wires 23 for receiving level signals and temperature signals output by the cable 20. The signal processing module 40 comprises a calculating unit 41 and a displaying unit 42. The calculating unit 41 is electronically connected with the temperature sensing units 24 and the displaying unit 42 for receiving the level signal and the temperature signal and calculating the material level and a temperature distribution of the material stored in a silo. The displaying unit 42 displays the material level.

The cable 20 further comprises a plurality of moisture sensing units 25. The moisture sensing units 25 are mounted in and along the sensing channel 21, and are electronically connected with the calculating unit 41 for transmitting moisture signals. The calculating unit 41 can calculate a moisture distribution of the material stored in the silo.

With reference to FIGS. 1, 2 and 3, a second end of the cable 20 comprises a core rod 260, an end sleeve 261, a connecting unit 270, an insulator 271, and a joint unit 272.

One end of the core rod 260 extends to the sensing channel 21 and is connected with the insulation layer 22. The end sleeve 261 encloses the core rod 260 and is connected with the insulation layer 22 for preventing water from permeating into the sensing channel 21 or the core rod 260. The connecting unit 270 is pivoted on the end sleeve 261 to adjust position of the cable 20. The insulator 271 is mounted between the connecting unit 270 and the jointing unit 272 to prevent the cable 20 from being electronically connected to ground. When the cable-based sensor is used to detect the material level of the material stored in the silo, the joint unit 272 is to be mounted on a floor of a silo so that the cable 20 will be stretched vertically.

With reference to FIGS. 8A, 8B to FIGS. 12A, 12B, the cable 20 has five embodiments. A first embodiment of the cable 20 is shown in the FIGS. 8A and 8B. The cable 20 comprises the sensing channel 21, the insulation layer 22, the steel wires 23, a mounting part 201, and a connecting part 202. The sensing channel 21 is covered by the insulation layer 22, and the steel wires 23 are mounted around the sensing channel 21 and embedded in the insulation layer 22. The mounting part 201 may be a flange, is connected with the electronic box 10 and mounted on the roof of the silo when the cable-based sensor is used to detect the material level. The connecting part 202 is connected with the electronic box 10 and covers the cable 20.

A second embodiment of the cable 20 is shown in FIGS. 9A and 9B. Compared with the first embodiment, the cable 20 further comprises an insulating sleeve 124. The insulating sleeve 124 is mounted around the insulation layer 22 for strengthening a connection between the cable 20 and the electronic box 10 and insulating a connection between the electronic box 10 and the material stored in the silo.

Figures 10A, 10B:
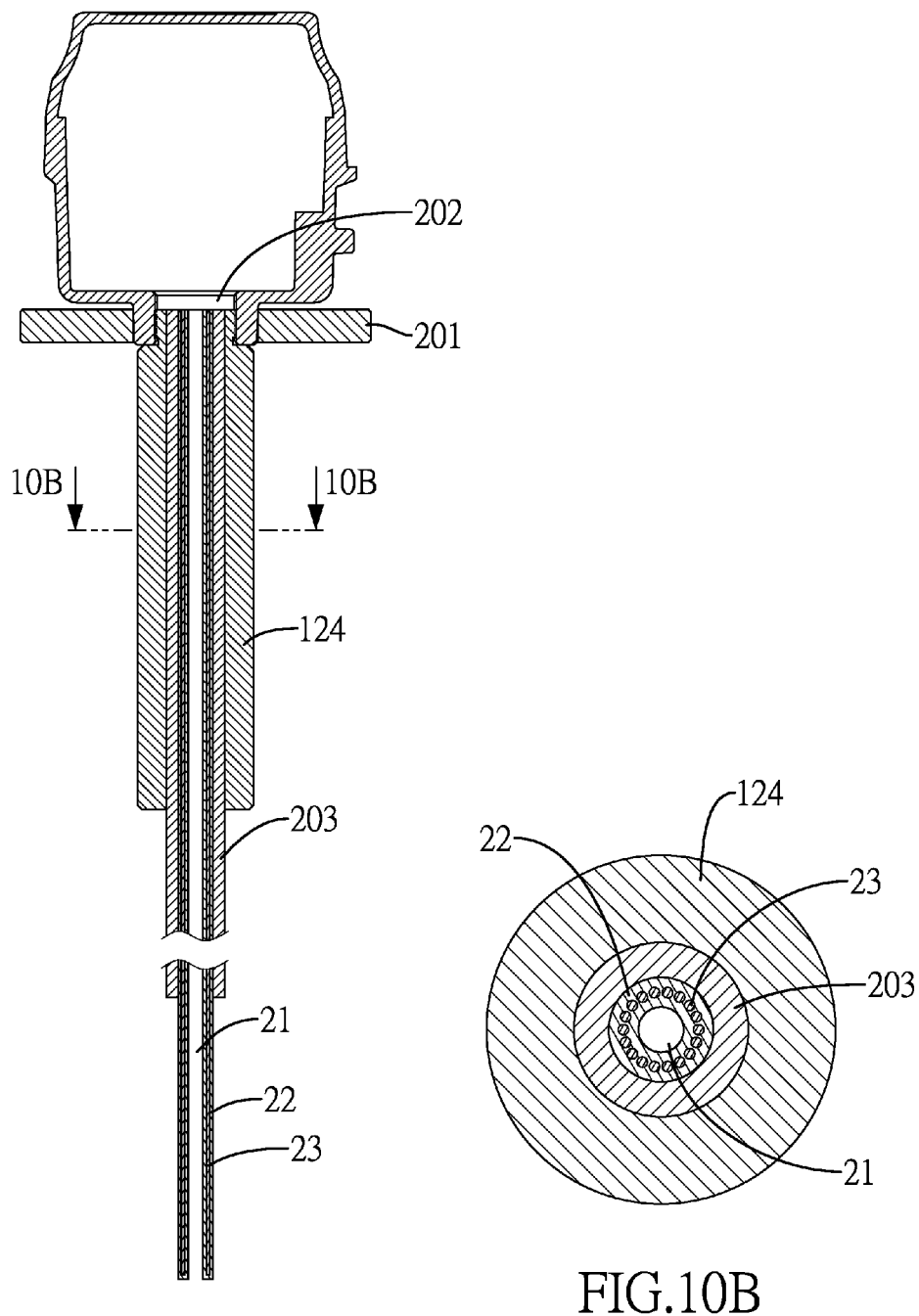
FIG. 10A is a cross-sectional side view of a third embodiment of a cable of the present invention.
FIG. 10B is a cross-sectional top view of the third embodiment of the cable.

A third embodiment of the cable 20 is shown in FIGS. 10A and 10B. Compared with the second embodiment, the cable 20 further comprises a protecting electrode 203. The protecting electrode 203 is mounted between the insulation layer 22 and the insulating sleeve 124. A voltage of the protecting electrode 203 is same as a voltage of the steel wires 23 for neutralizing an influence caused by any residues between the mounting part 201 and the sensing channel 21.

Figures 11A, 11B:
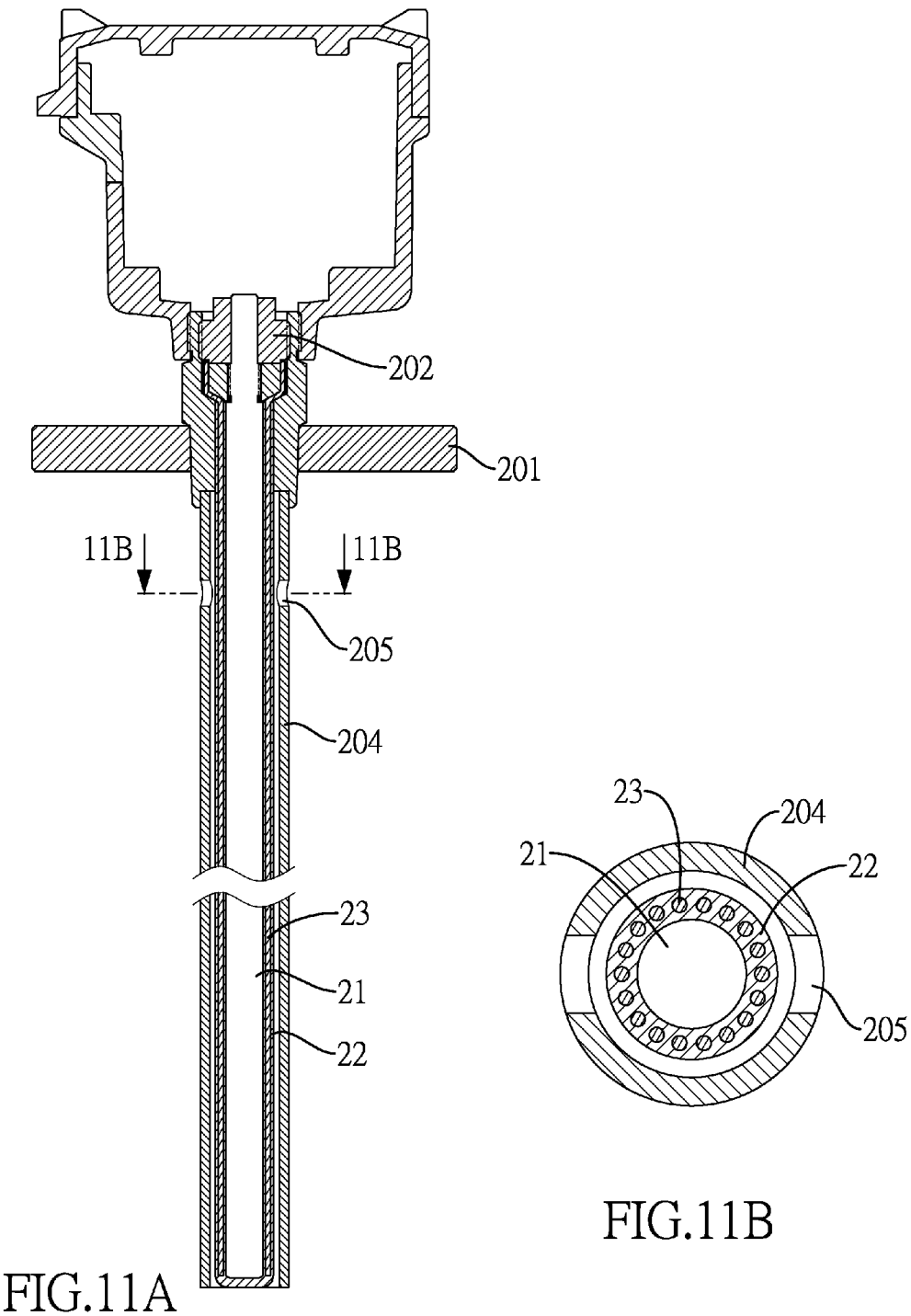
FIG. 11A is a cross-sectional side view of a fourth embodiment of a cable of the present invention.
FIG. 11B is a cross-sectional top view of the fourth embodiment of the cable.

A fourth embodiment of the cable 20 is shown in FIGS. 11A and 11B. Compared with the first embodiment, the cable 20 further comprises a concentric grounding tube 204. The concentric grounding tube 204 is mounted around the insulation layer 22, and an effusion hole 205 is formed through a side of the concentric grounding tube 204. The fourth embodiment is used to detect liquid materials. Therefore, the effusion hole 205 can balance pressures between inside and outside of the concentric grounding tube 204. The concentric grounding tube 204 is grounded for providing a reference voltage.

Figures 12A, 12B:
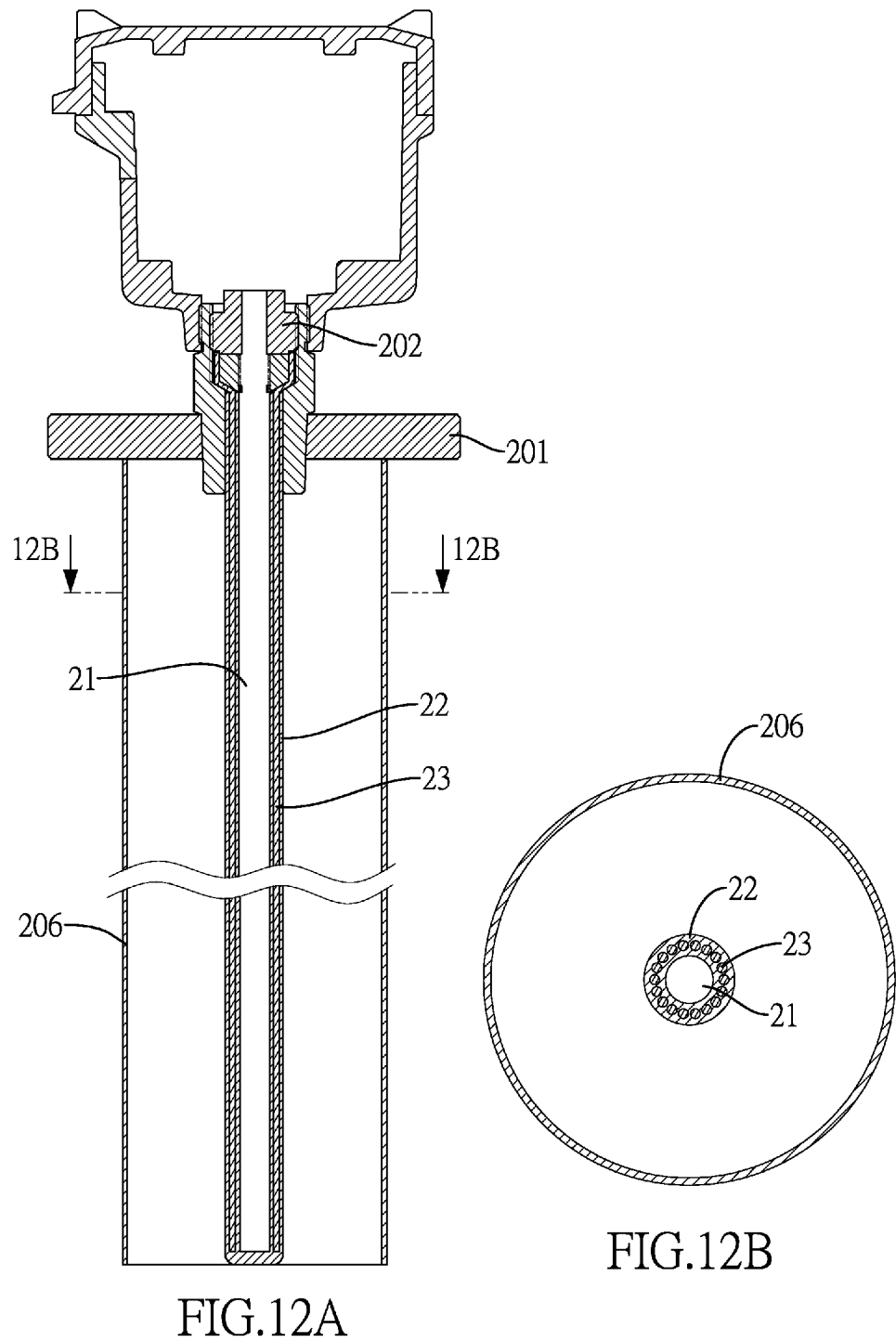
FIG. 12A is a cross-sectional side view of a fifth embodiment of a cable of the present invention.
FIG. 12B is a cross-sectional top view of the fifth embodiment of the cable.

A fifth embodiment of the cable 20 is shown in FIGS. 12A and 12B. Compared with the first embodiment, the cable 20 further comprises a grounding protection frame 206. The grounding protection frame 206 is mounted around the insulation layer 22 for grounding and providing a reference voltage. The fifth embodiment is used to detect solid materials, such as sandstones, powder, or cements. Therefore, the grounding protection frame 206 can also prevent the cable 20 from being damaged. In the fifth embodiment, the grounding protection frame 206 may be made by stainless steel, and the grounding protection frame 206 may be a mesh network, a squirrel-cage-like structure, or a tube.

Figure 13:
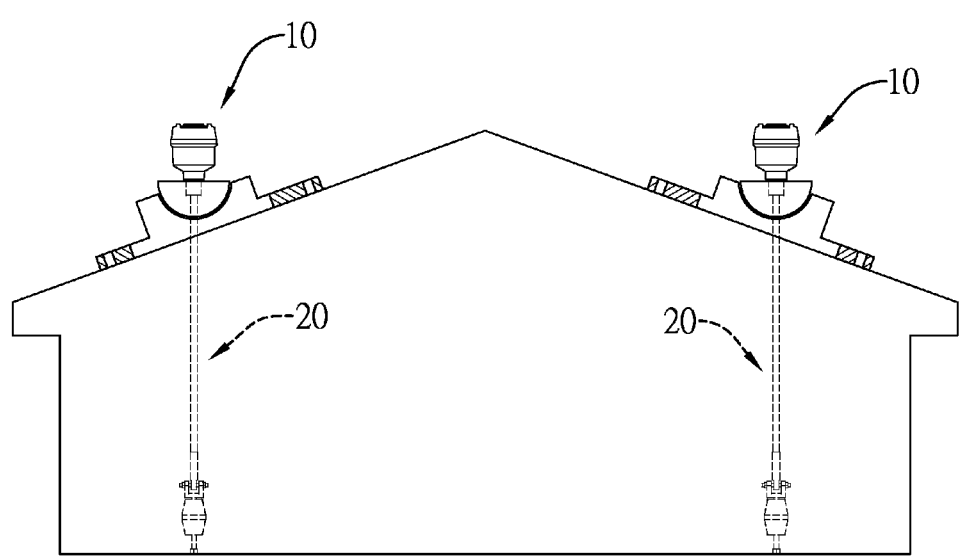
FIG. 13 is a schematic view showing the sensor of FIG. 1 is installed on a roof of a silo.

With reference to FIG. 13, when the cable-based sensor is installed on an inclined roof of a silo, the bottom 12 of the electronic box 10 is adjusted to be vertical with the horizon for accurately detecting the material level of the material stored in the silo to calculate an accurate amount of the material. Therefore, the cable-based sensor further comprises an installing base 50.

Figure 14:
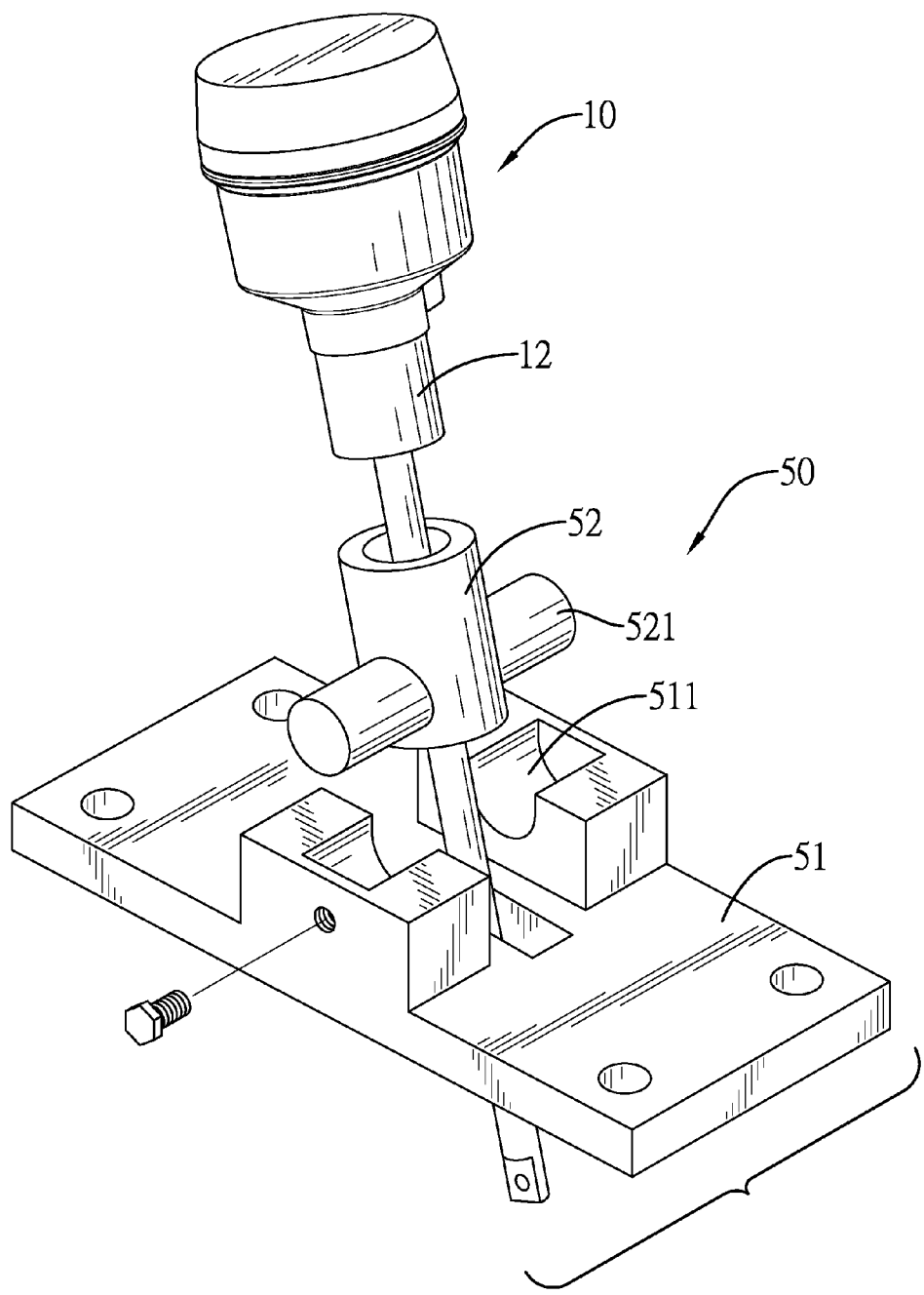
FIG. 14 is a perspective view of a first embodiment of an installing base of the present invention.

A first embodiment of an installing base 50 is shown in FIG. 14, and comprises a baseboard 51 and a rotating base 52. The baseboard 51 is to be mounted on the inclined roof, and the rotating base 52 is connected with the bottom 12 of the electronic box 10. Two rotating shafts 521 extend from opposite sides of the rotating base 52. Two arc notches 511 are formed in an installing top of the baseboard 51 for receiving the rotating shafts 521. The cable 20 extends through the rotating base 52 and the baseboard 51. The rotating shafts 521 are pivoted in the arc notches 511. Therefore, when the baseboard 51 is mounted on the inclined roof, the electronic box 10 can be pivoted on the installing base 50 for adjusting the cable 20 to be vertical with the horizon.

Figure 15:
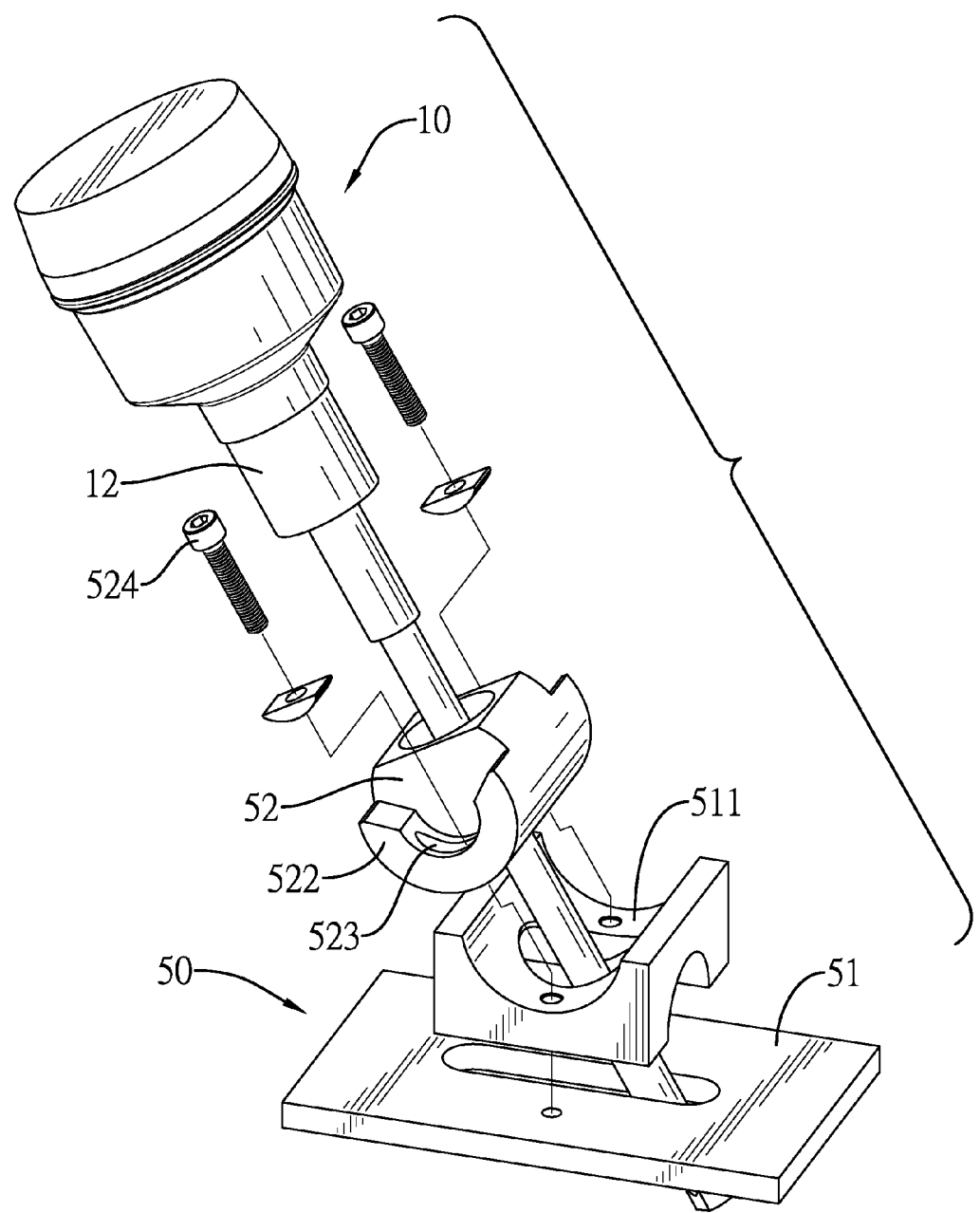
FIG. 15 is a perspective view of a second embodiment of an installing base of the present invention.

A second embodiment of the installing base 50 is shown in FIG. 15, and the baseboard 51 is mounted on the inclined roof. An arc notch 511 is formed in the installing top of the baseboard 51. Two arc ribs 522 separately extend from two opposite sides of the rotating base 52, and two sliding rails 523 are separately formed through the two arc ribs 522. Two mounting units 524 separately extend through the sliding rails 523, and are mounted in the arc notch 511. The cable 20 extends through the rotating base 52, the arc notch 511, and the baseboard 51. The rotating base 52 can be rotated in the arc notch 511, and a rotation angle of the rotating base 52 can be limited by the sliding rails 523 for avoiding over rotating.

Figure 16:
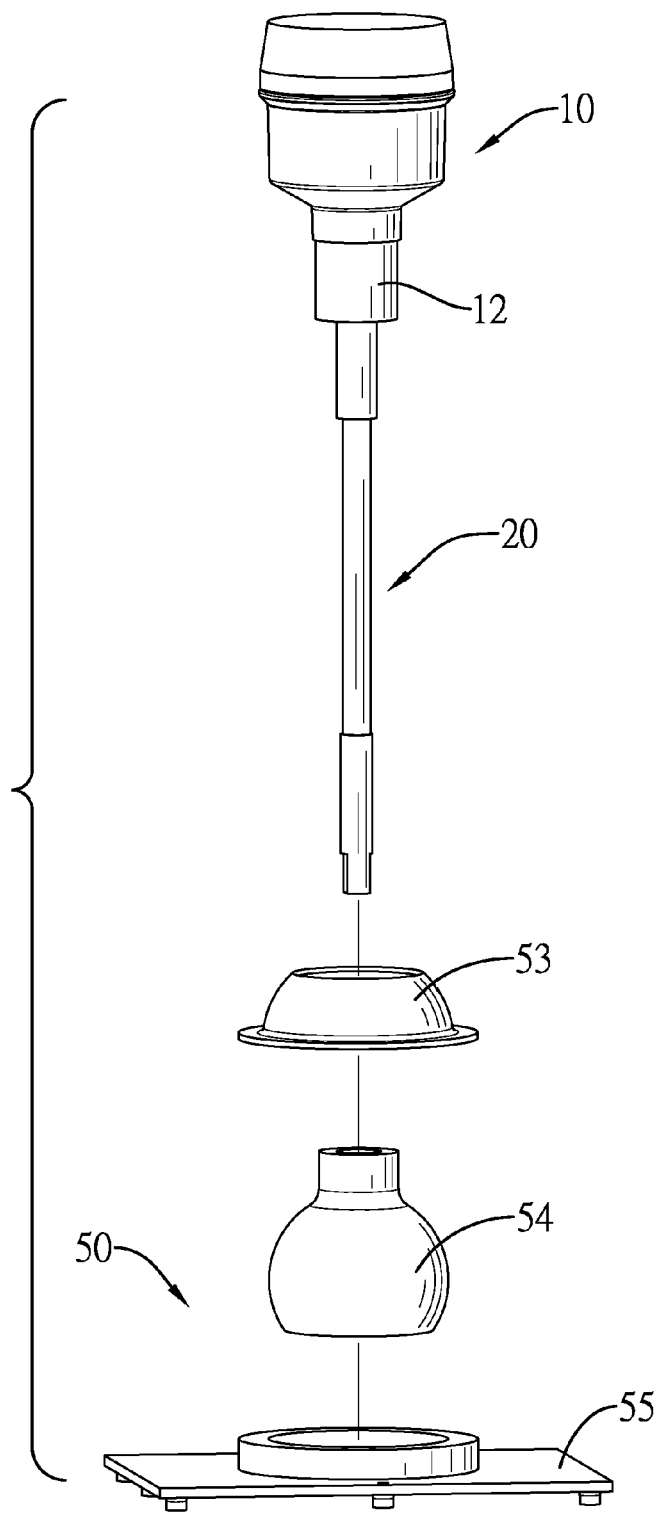
FIG. 16 is an exploded view of a third embodiment of an installing base of the present invention.

A third embodiment of the installing base 50 is shown in FIG. 16. The installing base 50 comprises a turning base 53, a turning ball 54, and a substrate 55. The turning ball 54 is positioned between the turning base 53 and the substrate 55, and the cable 20 extends through the turning base 53, the turning ball 54 and the substrate 55. The bottom 12 of the electronic box 10 is further mounted on the turning ball 54, and the turning ball 54 can be turned to any direction for adjusting the cable 20 to be vertical with the horizon.

In short, the cable 20 is connected to the electronic box 10 by enforcing the cable bud 231 to be sandwiched between the stopper 30 and the base 122. A structure of the cable bud 231 can strengthen a connection between the cable 20 and the electronic box 10 for avoiding damages caused by impacts of solid materials. Therefore, the cable 20 can be firmly mounted on the bottom 12 of the electronic box 10.

The cable 20 includes the temperature sensing units 24 and the moisture sensing units 25 to detect temperatures and moistures of the material stored in the silo. Then, a user can refer to the detected temperatures and moistures to adjust a temperature or moisture of the silo.

When the cable-based sensor is installed, the installing base 50 can be used for adjusting positions of the electronic box 10 and ensuring that the cable 20 is vertical with the horizon.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. A cable-based sensor, comprising:
   an electronic box comprising
      a top;
      a bottom;
      a space formed in the top;
      a hole formed though the bottom for communicating with the space;
      a base mounted in the bottom; and
      a tapered hole formed through the base;
   a cable having a first end extending to the tapered hole of the base and the hole of electronic box, and the cable comprising
      a sensing channel;
      an insulation layer covering the sensing channel;
      a plurality of steel wires embedded in the insulation layer, wherein terminals of the steel wires extend out of the insulation layer and spread to form a cable bud; and
      a plurality of temperature sensing units mounted in and along the sensing channel;
   a stopper being a tapered block and pressed into the tapered hole of the base for enforcing the cable bud to be sandwiched between the stopper and the base;
   a signal processing module mounted in the space of the electronic box and electronically connected with the temperature sensing units and the steel wires.

2. The cable-based sensor as claimed in claim 1, wherein the electronic box further comprises a waterproof connector mounted on a side of the electronic box.

3. The cable-based sensor as claimed in claim 1, wherein the cable further comprises a plurality of moisture sensing units mounted in and along the sensing channel and electronically connected with the signal processing module.

4. The cable-based sensor as claimed in claim 1, wherein a second end of the cable comprises:
   a core rod connected with the insulation layer; and
   an end sleeve enclosing the core rod and connected with the insulation layer.

5. The cable-based sensor as claimed in claim 4, wherein the cable further comprises:
   a connecting unit pivoted on the end sleeve;
   an insulator mounted on the connecting unit; and
   a jointing unit mounted on the insulator.

6. The cable-based sensor as claimed in claim 1, further comprising:

a rotating base connected with the bottom of the electronic box and having two rotating shafts extending from two opposite sides of the rotating base;
a baseboard having two arc notches formed on an installing top of the baseboard;
wherein the rotating shafts are received in the arc notches; and
wherein the cable extends through the rotating base and the baseboard.

7. The cable-based sensor as claimed in claim 1, further comprising:
a baseboard;
an arc notch formed in an installing top of the baseboard;
a rotating base having two arc ribs extending from two opposite sides of the rotating base; and
two mounting units extending through the rotating base and mounted in the arc notch;
wherein a sliding rail is formed through each arc rib;
wherein the cable extends through the rotating base, the arc notch, and the baseboard.

8. The cable-based sensor as claimed in claim 1, further comprising:
a turning base;
a substrate; and
a turning ball positioned between the turning base and the substrate;
wherein the cable extends through the turning base, the substrate, and the turning ball.

9. The cable-based sensor as claimed in claim 1, wherein the electronic box further comprises an insulating sleeve being a hollow tube and extending through the hole of the electronic box; and
wherein the insulating sleeve has an upper end mounted in the bottom to receive the base, and a lower end extending through the hole of the electronic box and mounted around the first end of the cable.

10. The cable-based sensor as claimed in claim 9, wherein the electronic box further comprises a waterproof connector mounted on a side of the electronic box.

11. The cable-based sensor as claimed in claim 9, wherein the cable further comprises a plurality of moisture sensing units mounted in and along the sensing channel and electronically connected with the signal processing module.

12. The cable-based sensor as claimed in claim 9, wherein a second end of the cable comprises:
a core rod connected with the insulation layer; and
an end sleeve enclosing the core rod and connected with the insulation layer.

13. The cable-based sensor as claimed in claim 12, wherein the cable further comprises:
a connecting unit pivoted on the end sleeve;
an insulator mounted on the connecting unit; and
a jointing unit mounted on the insulator.

14. The cable-based sensor as claimed in claim 9, further comprising:
a rotating base connected with the bottom of the electronic box and having two rotating shafts extending from two opposite sides of the rotating base;
a baseboard having two arc notches formed on an installing top of the baseboard;
wherein the rotating shafts are received in the arc notches; and
wherein the cable extends through the rotating base and the baseboard.

15. The cable-based sensor as claimed in claim 9, further comprising:
a baseboard;
an arc notch formed in an installing top of the baseboard;
a rotating base having two arc ribs extending from two opposite sides of the rotating base; and
two mounting units extending through the rotating base and mounted in the arc notch;
wherein a sliding rail is formed through each arc rib;
wherein the cable extends through the rotating base, the arc notch, and the baseboard.

16. The cable-based sensor as claimed in claim 9, further comprising:
a turning base;
a substrate; and
a turning ball positioned between the turning base and the substrate;
wherein the cable extends through the turning base, the substrate, and the turning ball.

17. The cable-based sensor as claimed in claim 9, wherein the cable further comprises a protecting electrode covering the insulation layer and covered by the insulating sleeve.

18. The cable-based sensor as claimed in claim 17, wherein the electronic box further comprises a waterproof connector mounted on a side of the electronic box.

19. The cable-based sensor as claimed in claim 17, wherein the cable further comprises a plurality of moisture sensing units mounted in and along the sensing channel and electronically connected with the signal processing module.

20. The cable-based sensor as claimed in claim 17, wherein a second end of the cable comprises:
a core rod connected with the insulation layer; and
an end sleeve enclosing the core rod and connected with the insulation layer.

21. The cable-based sensor as claimed in claim 20, wherein the cable further comprises:
a connecting unit pivoted on the end sleeve;
an insulator mounted on the connecting unit; and
a jointing unit mounted on the insulator.

22. The cable-based sensor as claimed in claim 17, further comprising:
a rotating base connected with the bottom of the electronic box and having two rotating shafts extending from two opposite sides of the rotating base;
a baseboard having two arc notches formed on an installing top of the baseboard;
wherein the rotating shafts are received in the arc notches; and
wherein the cable extends through the rotating base and the baseboard.

23. The cable-based sensor as claimed in claim 17, further comprising:
a baseboard;
an arc notch formed in an installing top of the baseboard;
a rotating base having two arc ribs extending from two opposite sides of the rotating base; and
two mounting units extending through the rotating base and mounted in the arc notch;
wherein a sliding rail is formed through each arc rib;
wherein the cable extends through the rotating base, the arc notch, and the baseboard.

24. The cable-based sensor as claimed in claim 17, further comprising:
a turning base;
a substrate; and
a turning ball positioned between the turning base and the substrate;
wherein the cable extends through the turning base, the substrate, and the turning ball.

25. The cable-based sensor as claimed in claim 1, wherein the cable further comprises:
a concentric grounding tube mounted around the insulation layer; and
an effusion hole formed through a side of the concentric grounding tube.

26. The cable-based sensor as claimed in claim 25, wherein the electronic box further comprises a waterproof connector mounted on a side of the electronic box.

27. The cable-based sensor as claimed in claim 25, wherein the cable further comprises a plurality of moisture sensing units mounted in and along the sensing channel and electronically connected with the signal processing module.

28. The cable-based sensor as claimed in claim 25, wherein a second end of the cable comprises:
a core rod connected with the insulation layer; and
an end sleeve enclosing the core rod and connected with the insulation layer.

29. The cable-based sensor as claimed in claim 28, wherein the cable further comprises:
a connecting unit pivoted on the end sleeve;
an insulator mounted on the connecting unit; and
a jointing unit mounted on the insulator.

30. The cable-based sensor as claimed in claim 25, further comprising:
a rotating base connected with the bottom of the electronic box and having two rotating shafts extending from two opposite sides of the rotating base;
a baseboard having two arc notches formed on an installing top of the baseboard;
wherein the rotating shafts are received in the arc notches; and
wherein the cable extends through the rotating base and the baseboard.

31. The cable-based sensor as claimed in claim 25, further comprising:
a baseboard;
an arc notch formed in an installing top of the baseboard;
a rotating base having two arc ribs extending from two opposite sides of the rotating base; and
two mounting units extending through the rotating base and mounted in the arc notch;
wherein a sliding rail is formed through each arc rib;
wherein the cable extends through the rotating base, the arc notch, and the baseboard.

32. The cable-based sensor as claimed in claim 25, further comprising:
a turning base;
a substrate; and
a turning ball positioned between the turning base and the substrate;
wherein the cable extends through the turning base, the substrate, and the turning ball.

33. The cable-based sensor as claimed in claim 1, wherein the cable further comprises a grounding protection frame mounted around the insulation layer.

34. The cable-based sensor as claimed in claim 33, wherein the electronic box further comprises a waterproof connector mounted on a side of the electronic box.

35. The cable-based sensor as claimed in claim 33, wherein the cable further comprises a plurality of moisture sensing units mounted in and along the sensing channel and electronically connected with the signal processing module.

36. The cable-based sensor as claimed in claim 33, wherein a second end of the cable comprises:
a core rod connected with the insulation layer; and
an end sleeve enclosing the core rod and connected with the insulation layer.

37. The cable-based sensor as claimed in claim 36, wherein the cable further comprises:
a connecting unit pivoted on the end sleeve;
an insulator mounted on the connecting unit; and
a jointing unit mounted on the insulator.

38. The cable-based sensor as claimed in claim 33, further comprising:
a rotating base connected with the bottom of the electronic box and having two rotating shafts extending from two opposite sides of the rotating base;
a baseboard having two arc notches formed on an installing top of the baseboard;
wherein the rotating shafts are received in the arc notches; and
wherein the cable extends through the rotating base and the baseboard.

39. The cable-based sensor as claimed in claim 33, further comprising:
a baseboard;
an arc notch formed in an installing top of the baseboard;
a rotating base having two arc ribs extending from two opposite sides of the rotating base; and
two mounting units extending through the rotating base and mounted in the arc notch;
wherein a sliding rail is formed through each arc rib;
wherein the cable extends through the rotating base, the arc notch, and the baseboard.

40. The cable-based sensor as claimed in claim 33, further comprising:
a turning base;
a substrate; and
a turning ball positioned between the turning base and the substrate;
wherein the cable extends through the turning base, the substrate, and the turning ball.

* * * * *